(12) United States Patent
Mendiola et al.

(10) Patent No.: US 8,229,395 B2
(45) Date of Patent: Jul. 24, 2012

(54) SYSTEM AND METHOD FOR FACILITATING COMMUNICATION BETWEEN TWO PARTIES

(75) Inventors: Dennis Mendiola, New York, NY (US); Chito Bustamante, Pasig (PH)

(73) Assignee: Chikka PTE Ltd., Singapore (SG)

( * ) Notice: Subject to any disclaimer, the term of this patent is extended or adjusted under 35 U.S.C. 154(b) by 1664 days.

(21) Appl. No.: 11/568,700

(22) PCT Filed: May 3, 2004

(86) PCT No.: PCT/SG2004/000236
§ 371 (c)(1),
(2), (4) Date: Nov. 3, 2006

(87) PCT Pub. No.: WO2005/107284
PCT Pub. Date: Nov. 10, 2005

(65) Prior Publication Data
US 2007/0172039 A1    Jul. 26, 2007

(30) Foreign Application Priority Data

May 3, 2004    (SG) .............................. 200403611-7

(51) Int. Cl.
*H04M 15/00* (2006.01)
*H04M 1/64* (2006.01)
(52) U.S. Cl. ..... 455/408; 455/407; 455/466; 379/88.23; 379/114.2
(58) Field of Classification Search ............... 379/88.11, 379/88.12, 88.19, 88.2, 88.22, 88.23, 111, 379/114.01, 114.16, 114.2, 114.22, 121.01, 379/130, 144.01; 455/406, 407, 408, 466; 705/40
See application file for complete search history.

(56) References Cited

U.S. PATENT DOCUMENTS

| | | | |
|---|---|---|---|
| 6,424,706 B1 * | 7/2002 | Katz et al. | 379/144.01 |
| 6,564,047 B1 * | 5/2003 | Steele et al. | 455/405 |
| 6,987,844 B2 * | 1/2006 | Himmel et al. | 379/114.2 |
| 6,999,750 B2 * | 2/2006 | Aoyama et al. | 455/406 |
| 7,761,083 B2 * | 7/2010 | Marsh et al. | 455/406 |
| 2003/0045267 A1 * | 3/2003 | Himmel et al. | 455/406 |

(Continued)

OTHER PUBLICATIONS

World Intellectual Property Organization, International Search Report for PCT/SG2004/00236.

(Continued)

*Primary Examiner* — Binh Tieu
(74) *Attorney, Agent, or Firm* — Intellectual Property Law Group LLP (57) ABSTRACT

In accordance with a first aspect of the invention there is a system (10) for facilitating communications between two parties comprising a first party (12) having positive credit with a communication facilitator (16) and a second party (14) having insufficient credit with the communications facilitator (16) to initiate or continue communication. The first party (12) sends a first communication message (26) to a first destination address (18) associated with the communication facilitator (16). The communication facilitator (16) includes the first communication message (18), or at least a portion thereof, in a second communication message (28) which is sent to the second party (14) via a second destination address (22). The second party (14) replies to the second communication message (28), the reply being received at the second destination address (22)—the communication facilitator (16) thereafter operates to forward the reply to the second communication message (28) to the first party (12) and charge the first party (12) for the first and second communication messages (26, 28).

47 Claims, 1 Drawing Sheet

U.S. PATENT DOCUMENTS

2006/0041505 A1* 2/2006 Enyart .......................... 705/40
2007/0140450 A1* 6/2007 Babi et al. .................. 379/114.2
2008/0027839 A1* 1/2008 O'Regan et al. ................ 705/34
2008/0130849 A1* 6/2008 Mock et al. .............. 379/114.01

OTHER PUBLICATIONS

World Intellectual Property Organization, International Preliminary Report on Patentability for PCT/SG2004/00236.

* cited by examiner

SYSTEM AND METHOD FOR FACILITATING COMMUNICATION BETWEEN TWO PARTIES

FIELD OF THE INVENTION

The present invention relates to a system and method for facilitating communications between two parties. The invention is particularly directed towards facilitating communications between two customers of a telecommunications carrier, one of the customers wishing to reply to messages for free or who may no longer having sufficient credit with the telecommunications carrier to initiate or continue communication.

BACKGROUND ART

The following discussion of the background of the invention is intended to facilitate an understanding of the present invention. However, it should be appreciated that the discussion is not an acknowledgement or admission that any of the material referred to was published, known or part of the common general knowledge of the person skilled in the art in any jurisdiction as at the date of the application.

A pre-paid mobile phone subscriber can often have a zero balance with their telecommunications carrier or insufficient pre-paid credits to carry out a transaction, place a voice call or send an SMS message or text. In the case if zero balance, this prevents the subscriber from initiating or continuing communication—particularly in situations where communication is being facilitated by SMS or similar messaging arrangement. Depending on the telecommunications carrier, this may also prevent the subscriber from receiving communications.

This situation can be frustrating for people seeking to communicate with the subscriber. Accordingly, it is an object of the present invention to provide a system whereby a party can communicate with a subscriber who may wish to avail of a free reply to a message or who may not having sufficient credit with their telecommunications carrier to initiate or continue communication.

SUMMARY OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

In accordance with a first aspect of the invention there is a system for facilitating communications between a first and second party, each having a communications device for communicating with the communication facilitator, and at least the first party having credit with the communication facilitator, where, to assist the second party to communicate with the first party;
 the first party sends a first communication message using the first communications device to a first destination address associated with the communication facilitator;
 the communication facilitator determines unique identifiers of the communications devices possessed by the first and second party, respectively, from the first communication message or information associated with the first communication message;
 the communication facilitator includes the first communication message, or at least a portion thereof, in a second communication message which is sent to the communications device of the second party, as determined by its unique identifier, via a second destination address;
 the second party replies to the second communication message using its communications device, the reply being received by the communication facilitator; and
 the communication facilitator operates to forward the reply to the second communication message to the first communications device of the first party, as determined by its unique identifier, and make a charge against the credit the first party has with the communication facilitator for at least the first communication message and the reply to the second communication message, the credit the first party has with the communication facilitator being identified by way of the unique identifier of the first communications device.

The first and second destination addresses may each be associated with a shortcode. Alternatively, the first and second destination addresses may be associated with the same shortcode.

The first communication message may be sent to a destination address comprising the shortcode associated with the first communication address and a unique identifier representing the second party. Similarly, the reply to the second communication message may be sent to a destination address comprising the shortcode associated with the second communication address and a unique identifier representing the first party. Alternatively, the unique identifier of the first party or the second party, as appropriate to the message sent, may be included in the body of the communication message.

The second communication message may also include the unique identifier of the first party. In this manner, the reply to the second communication message, by including the unique identifier of the first party, can be properly matched up with the first party.

The unique identifier may be the party's mobile phone number, home phone number, or e-mail address. The first and second communication message, and the reply, may take the form of a SMS message; MMS message; or e-mail message.

The communication facilitator may establish a virtual credit account and associate the virtual credit account with the second party. In this arrangement, whenever the communication facilitator receives a first communication message, the virtual credit account is incremented and when the communication facilitator receives a reply to the second communication message the virtual credit account is decremented. The virtual credit account may also be associated with the first party to ensure that the second party may only use credits accrued in the virtual credit account for replies to the first party. Thus, a second party may have multiple virtual credit accounts.

Alternatively, the communication facilitator may operate to increment the credit the second party has with the communication facilitator by an amount specified in the first communication message. In such an arrangement, the second party is informed of the amount of increase in their credit.

The communication facilitator may be separate from, or a part of, a telecommunications carrier.

In accordance with a second aspect of the present invention there is a system for facilitating communications between a first and second party, each having a communications device for communicating with the communication facilitator and at least the first party having credit with the communication facilitator, where, to assist the second party to communicate with the first party:
 the first party sends a first communication message using a first communications device to a first destination address associated with the communication facilitator;

the communication facilitator operable to determine the unique identifiers of the first and second communications devices possessed by the first and second party respectively, from the first communication message or information associated with the first communication message;

the communication facilitator operable to increase the credit the second party has with the communication facilitator by a specified monetary amount or message credits, the second party being identified by way of the unique identifier of the second communications device;

the communication facilitator includes the first communication message or at least a portion thereof in a second communication message which is sent to the second communications device of the second party via a second destination address, the second communication message including the unique identifier of the first communications device of the first party;

the second party replies to the first party directly using the unique identifier of the first communications device of the first party specified in the second communication message; and the communication facilitator operates to make a charge against the credit of the first party for at least the specified amount and the first communication message, the credit the first party has with the communication facilitator being identified by way of the unique identifier of the first communications device.

In accordance with a third aspect of the present invention there is a communication facilitator for use in a system for facilitating communications between a first and second party each having a communications device for communicating with the communication facilitator, where on receipt of a first communication message at a first destination address sent by the first communications device possessed by the first party, the communication facilitator determines unique identifiers of the communications devices of the first and second party, respectively from the first communication message or information associated with the first communication message; sends a second communication message to the communication device possessed by the second party, as determined by its unique identifier, via a second destination address, the second communication message including the first communication message or at least a portion thereof; receives a reply to the second communication message from the communications device possessed by the second party; forwards the reply to the second communication message to the communications device possessed by the first party, as determined by its unique identifier, and makes a charge against credit the first party has with the communication facilitator for at least the first communication message and the reply to the second communication message, the credit the first party has with the communication facilitator being identified by way of the unique identifier of the first communications device.

In accordance with a fourth aspect of the present invention there is a communication facilitator for use in a system for facilitating communications between a first and second party each having a communication device for communicating with the communication facilitator and at least the first party having credit with the communication facilitator, where on receipt of a first communication message sent by a first communications device possessed by the first party at a first destination address associated with the communications facilitator, unique identifiers of the first and second communications devices possessed by the first and second party, respectively, are determined from the first communication message or information associated with the first communication message; the amount of credit the second party has with the communication facilitator, as identified by way of the unique identifier of the second communications device, is increased by a specified monetary amount or message credits; the first communication message or at least a portion thereof is included in a second communication message which is sent to the second communications device of the second party via a second destination address, the second communication message including the unique identifier of the first communications device of the first party; and operable to make a charge against the credit of the first party for at least the specified amount and the first communication message, the credit the first party has with the communication facilitator being identified by way of the unique identifier of the first communications device.

In accordance with a fifth aspect of the present invention there is a method of facilitating communications between a first and second party, comprising the steps of:

receiving a first communication message from a communications device possessed by the first party at a first destination address;

determining the unique identifiers of the communications devices possessed by the first and second party, respectively, from the first communication message or information associated with the first communication message;

including the first communication message, or at least a portion thereof, in a second communication message and sending the second communication message to the communications device possessed by the second party via a second destination address;

receiving a reply to the second communication message from the second party sent using the communications device possessed by the second party;

forwarding the reply to the second communication message to the communications device possessed by the first party; and making a charge against credit in favour of the first party for at least the first communication message and the reply to the second communication message, the credit in favour of the first party being identified by way of the unique identifier of the communications device possessed by the first party.

In accordance with a sixth aspect of the present invention there is a method of facilitating communications between a first and second party, including the steps:

receiving a first communication message sent using a communications device possessed by the first party at a first destination address;

determining the unique identifiers of the communications devices of the first and second party, respectively, from the first communication message or information associated with the first communication message;

increasing credit in favour of the second party by a specified monetary amount or message credits;

including the first communication message, or at least a portion thereof, in a second communication message and sending the second communication message to the communications device possessed by the second party via a second destination address, the second communication message also including the unique identifier of the communications device possessed by the first party;

making a charge against credit in favour of the first party for at least the specified amount and the first communication message, the credit in favour of the first party being identified by way of the unique identifier of the communications device possessed by the first party.

In accordance with a seventh aspect of the present invention there is a communication message forwarded to a communications device possessed by a first party, as determined by its unique identifier, the communication message being sent by a communication facilitator on receiving the communication message from a communications device possessed by a second party, the communication message being sent in response to a second communication message sent by the communication facilitator via a first destination address associated with the communication facilitator to the communications device possessed by the second party, as determined by its unique identifier, the second communication message including a third communication message, or at least a portion thereof, the communication facilitator operable to determine the unique identifiers of the communications devices of the first and second party from the third communication message, or from information associated therewith, where the third communication message is sent by the first party to a second destination address associated with the communication facilitator, the credit the first party has with the communication facilitator being charged for at least the communication message and the third communication message, said credit being identified by way of the unique identifier of the communications device possessed by the first party.

In accordance with an eight aspect of the present invention there is a communication message forwarded to a communications device possessed by a first party, as determined by its unique identifier, the communication message being sent by a communications device possessed by a second party on receiving a second communication message from a communication facilitator, the second communication message being forwarded to the communications device possessed by the second party via a second destination address in response to a third communication message sent using the communications device possessed by the first party, the second communication message including the third communication message, or at least a portion thereof, and the unique identifier of the communications device possessed by the first party; the payment facilitator operable to determine the unique identifiers of the first and second communications devices possessed by the first and second party, respectively, from the third communication message or information associated with the first communication message, the credit the first party has with the communication facilitator being charged for at least the communication message and a specified amount, said credit being identified by way of the unique identifier of the communications device possessed by the first party and the credit the second party has with the communication facilitator being increased by the specified amount or message credits equal to the specified amount, said credit being identified by way of the unique identifier of the communications device possessed by the second party.

In accordance with a ninth aspect of the present invention there is a computer readable medium having software recorded thereon, said software including:
  receiving means for receiving a first communication message from a communications device possessed by the first party at a first destination address;
  identification means for determining the unique identifiers of the communications devices possessed by the first and second party, respectively, from the first communication message or information associated with the first communication message;
  forwarding means for including the first communication message, or at least a portion thereof, in a second communication message and sending the second communication message to the communications device possessed by the second party via a second destination address;
  reply means for receiving a reply to the second communication message from the second party sent using the communications device possessed by the second party;
  onforwarding means for forwarding the reply to the second communication message to the communications device possessed by the first party; and
  accounting means for making a charge against credit in favour of the first party for the at least the first communication message and the reply to the second communication message, the credit in favour of the first party being identified by way of the unique identifier of the communications device possessed by the first party.

In accordance with a tenth aspect of the present invention there is a computer readable medium having software recorded thereon, said software including:
  receiving means for receiving a first communication message sent using a communications device possessed by the first party at a first destination address;
  identification means for determining the unique identifiers of the communications devices of the first and second party, respectively, from the first communication message or information associated with the first communication message;
  crediting means for increasing credit in favour of the second party by a specified monetary amount or message credits;
  forwarding means for including the first communication message, or at least a portion thereof, in a second communication message and sending the second communication message to the communications device possessed by the second party via a second destination address, the second communication message also including the unique identifier of the communications device possessed by the first party;
  accounting means for making a charge against credit in favour of the first party for at least the specified amount and the first communication message, the credit in favour of the first party being identified by way of the unique identifier of the communications device possessed by the first party.

BRIEF DESCRIPTION OF THE DRAWINGS

The invention will be better understood in the light of the following description, made with reference to the drawings, wherein.

DETAILED DESCRIPTION OF SPECIFIC EMBODIMENTS

Figure 1:
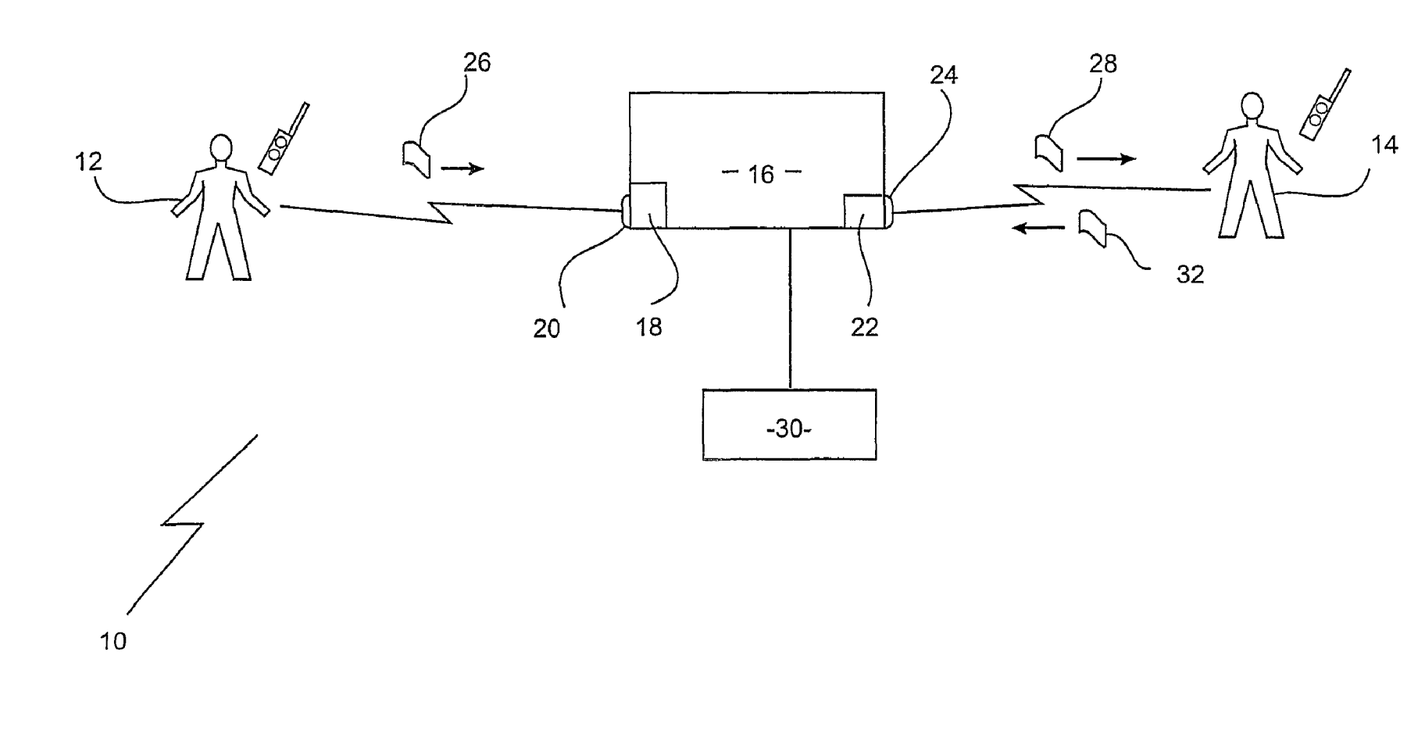
FIG. 1 is a schematic representation of a system for facilitating communications between parties in accordance with the present invention.

In accordance with a first embodiment of the invention there is a system 10 for facilitating communications between two parties 12, 14. In this embodiment, parties 12, 14 are mobile phone subscribers of a telecommunications carrier 16. Party 12 has a large credit balance with the telecommunications carrier 16. Party 14 has a zero credit balance with the telecommunications carrier 16.

Telecommunications carrier 16 operates:
  a first destination address 18 having an associated shortcode 20; and
  a second destination address 22 having an associated shortcode 24.

In this embodiment, associated shortcode 20 is the prefix "5" and associated shortcode 24 is the prefix "6".

The operation of the system 10 of this embodiment will now be described in the context of the following example.

Party 12 sends an SMS message 26 intended for party 14 using their mobile phone. The SMS message 26 is sent to the first destination address 18 by sending the SMS message 26 to a combination of associated shortcode 20 and the mobile phone number of party 14.

Telecommunications carrier 16 receives the SMS message 26 via the destination address. Upon receipt, telecommunications carrier 16 operates to amend the SMS message 26 to form a new SMS message 28. SMS message 28 includes the content of SMS message 26 and an additional note. The additional note is intended to inform party 14 that a reply to SMS message 28 will be passed to party 12 without charge. SMS message 28 is then sent to party's 14 mobile phone. The source address (ie. the phone number of the communication initiator) of the SMS message 28 is set to a combination of associated shortcode 24 and the mobile phone number of party 12.

In conjunction with forming SMS message 28, the telecommunications carrier 16 operates to establish a virtual credit account 30 (if not already established). Virtual credit account 30 is associated with party 14 (by means of party's 14 mobile phone number). If virtual credit account 30 is already established, the value of the virtual credit account is incremented by one. Otherwise, the virtual credit account 30 is set to an initial value of 1.

Party 14 then replies to SMS message 28 by means of further SMS message 32. As further SMS message 32 is sent in reply to SMS message 28, it is received by telecommunications carrier 16 at second destination address 22. Telecommunications carrier 16 processes the further SMS message 32 to identify the mobile phone number of the sender. The mobile phone number of the sender is then used as a reference for determining the associated virtual credit account 30. The associated virtual credit account 30 is then decremented by 1.

The further SMS message 32 is then forwarded by telecommunications carrier 16 to party 12. The charges for each SMS message 26, 28, 32, plus any service charge levied by the telecommunications carrier 16, are all debited from party's 12 account with the telecommunications carrier 16.

A second embodiment of the invention will now be described. The configuration of the second embodiment is identical to that of the first embodiment already described. Accordingly, in this second embodiment, like numerals reference like parts.

Party 12 sends an SMS message 26 intended for party 14 using their mobile phone. The SMS message 26 is sent to the first destination address 18 by sending the SMS message 26 to a combination of associated shortcode 20 and the mobile phone number of party 14. The content of the SMS message 26 includes an amount to transfer to party 14 and the message intended for party 14.

Telecommunications carrier 16 receives the SMS message 26 via the destination address. Upon receipt, telecommunications carrier 16 operates to amend the SMS message 26 to form a-new SMS message 28. SMS message 28 includes the content of SMS message 26 (but with the amount to be transferred omitted) and an additional note. The additional note is intended to inform party 14 that their account with telecommunications carrier 16 has been incremented by the amount specified in SMS message 26. SMS message 28 is then sent to party's 14 mobile phone. The source address (ie. the phone number of the communication initiator) of the SMS message 28 is set to the mobile phone number of party 12.

Also on receipt of the SMS message 26, the telecommunications carrier 16 operates to parse the SMS message 26 to identify the amount to be credited to party 14. The party's 14 credit balance with the telecommunications carrier 16 is then incremented by the amount specified.

As party 14 now has a positive credit balance with telecommunications carrier 16, party 14 can communicate with party 12 as desired. As a result, party 14 is charged as normal for any communication message they may send to party 12. Party 12, however, is charged for:

their SMS message 26;
the amount specified in SMS message 26; and
any service charges levied by the telecommunications carrier 16.

A third embodiment of the invention will now be described. The configuration of the third embodiment, like the second embodiment, is identical to that of the first embodiment already described. Accordingly, in this third embodiment, like numerals reference like parts. The exception is that shortcode 20 and shortcode 24 are the same in this example, and will hereafter be referred to simply as shortcode 20.

Party 12 sends an SMS message 26 intended for party 14 using their mobile phone. The SMS message 26 is sent to the first destination address 18 by sending the SMS message 26 to associated shortcode 20. The SMS message 26 comprises a first keyword, such as "GIVE", the recipient's mobile phone number ie. the mobile phone number of party 14, and the message to be forwarded to party 14.

Telecommunications carrier 16 receives the SMS message 26 via the destination address. Upon receipt, telecommunications carrier 16 operates to amend the SMS message 26 to form a new SMS message 28. SMS message 28 includes the content of SMS message 26 (bar the first keyword and recipient's mobile phone number) and an additional note. The additional note is intended to inform party 14 that a reply to SMS message 28 will be passed to party 12 without charge by following a designated procedure (described below). SMS message 28 is then sent to party's 14 mobile phone. The source address (ie. the phone number of the communication initiator) of the SMS message 28 is set to a combination of associated shortcode 24 and the mobile phone number of party 12.

In conjunction with forming SMS message 28, the telecommunications carrier 16 operates to establish a virtual credit account 30 (if not already established). Virtual credit account 30 is associated with party 14 (by means of party's 14 mobile phone number). If virtual credit account 30 is already established, the value of the virtual credit account is incremented by one. Otherwise, the virtual credit account 30 is set to an initial value of 1.

Party 14 then replies to SMS message 28 by means of further SMS message 32. This further SMS message 32 includes a second keyword, such as "FREE", to indicate that the message is not to be charged for.

As further SMS message 32 is sent in reply to SMS message 28, it is received by telecommunications carrier 16 at second destination address 22. Telecommunications carrier 16 processes the further SMS message 32 to identify the mobile phone number of the sender. The mobile phone number of the sender is then used as a reference for determining the associated virtual credit account 30. The associated virtual credit account 30 is then decremented by 1.

The further SMS message 32 is then forwarded by telecommunications carrier 16 to party 12 (minus the second keyword). The charges for each SMS message 26, 28, 32, plus any service charge leveled by the telecommunications carrier 16, are all debited from party's 12 account with the telecommunications carrier 16.

It should be appreciated by the person skilled in the art that the invention is not limited to the embodiments described. In particular, the inventions as described can include the following modifications and/or additions:

- The shortcodes 20, 24 associated with first destination address 18 and second destination address 22 may be changed. For example, the shortcodes 20, 24 can be identical or may be identical with a variant number being used to distinguish "crediting" calls from free responses.
- The role of telecommunications carrier 16 may be fulfilled by a third party not associated with a telecommunications carrier 16, such as a communication facilitator.
- While the system has been described in the context of a mobile phone, any communication device can be used. Accordingly, the communication messages, while expected to be predominantly SMS messages, can also be MMS messages or e-mail messages.
- The virtual account 20 may also be associated with the first party 12. In this manner, virtual account 20 may only be decremented when the second party 14 replies to the first party 12 and not when a reply is made in general. This also means that a second party 14 may have multiple virtual credit accounts.
- The third embodiment may be modified so as to remove the need to enter an amount to be transferred. In such an arrangement, the amount to be transferred is an attribute of the associated shortcode 20 of the destination address 18 to which SMS message 26 is sent.
- Virtual account 20 may be omitted. In this arrangement, a response received from second party 14 will be considered a match to the immediately previous SMS message 26 received from first party 12.

It should be further appreciated by the person skilled in the art that variations and combinations of features described above, not being alternatives or substitutes, can be combined to form yet further embodiments falling within the intended scope of the invention.

We claim:

1. A system for facilitating communications between a first and second party, each having a communications device for communicating with the communication facilitator, and at least the first party having credit with the communication facilitator, where, to assist the second party to communicate with the first party:
   the first party sends a first communication message using the first communications device to a first destination address associated with the communication facilitator;
   the communication facilitator operable to determine unique identifiers of the communications devices possessed by the first and second party, respectively, from the first communication message or information associated with the first communication message;
   the communication facilitator includes the first communication message, or at least a portion thereof, in a second communication message which is sent to the communications device of the second party, as determined by its unique identifier, via a second destination address;
   the second party replies to the second communication message using its communications device, the reply being received by the communication facilitator; and
   the communication facilitator operates to forward the reply to the second communication message to the first communications device of the first party, as determined by its unique identifier, and make a charge against the credit the first party has with the communication facilitator for at least the first communication message and the reply to the second communication message, the credit the first party has with the communication facilitator being identified by way of the unique identifier of the first communications device.

2. A system for facilitating communications between a first and second party according to claim 1, where the communication facilitator receives the reply to the second communication message via the second destination address.

3. A system for facilitating communications between a first and second party according to claim 1 or claim 2, where the communication facilitator operates to include the unique identifier of the first communications device of the first party in the second communication message, the reply to the second communication message including the unique identifier either as part of the message or as a suffix of dial tones to the destination address to which it is sent.

4. A system for facilitating communications between a first and second party according to claim 1, where the second party has at least one virtual account associated with the second communication device, the communication facilitator operable to increment the virtual account by a specified amount on receipt of the first communication message and operable to decrement the at least one virtual account by a specified amount on receipt of a reply to the second communication message.

5. A system for facilitating communications between a first and second party according to claim 4, where at least one of the at least one virtual account is also associated with the first communications device of the first party, the communication facilitator operable to increment the virtual account associated with both the communications devices of the first and second party by a specified amount on receipt of the first communication message and operable to decrement the virtual account associated with both the communications devices of the first and second party by a specified amount on receipt of a reply to the second communication message.

6. A system for facilitating communications between a first and second party according to claim 4 or claim 5, where each virtual account acts as a counter and where the specified amount is included in the first communication message.

7. A system for facilitating communications between a first and second party according to claim 1, the communication facilitator operable to increment the amount of credit the second party has with the communication facilitator by a specified monetary amount on receipt of the first communication message, the credit the second party has with the communication facilitator being identified by way of the unique identifier of the second communications device.

8. A system for facilitating communications between a first and second party according to claim 1, where the first destination address and the second destination address are the same and a reply to the second communication message is received at the combined destination address, and where a flag or keyword is included in the first communication message and the reply to the second communication message to facilitate distinction between the first communication message and the reply to the second communication message.

9. A system for facilitating communications between a first and second party, each having a communications device for communicating with the communication facilitator and at least the first party having credit with the communication facilitator, where, to assist the second party to communicate with the first party:

the first party sends a first communication message using a first communications device to a first destination address associated with the communication facilitator;

the communication facilitator operable to determine the unique identifiers of the first and second communications devices possessed by the first and second party respectively, from the first communication message or information associated with the first communication message;

the communication facilitator operable to increase the credit the second party has with the communication facilitator by a specified monetary amount or message credits, the second party being identified by way of the unique identifier of the second communications device;

the communication facilitator includes the first communication message or at least a portion thereof in a second communication message which is sent to the second communications device of the second party via a second destination address, the second communication message including the unique identifier of the first communications device of the first party;

the second party replies to the first party directly using the unique identifier of the first communications device of the first party specified in the second communication message; and the communication facilitator operates to make a charge against the credit of the first party for at least the specified amount and the first communication message, the credit the first party has with the communication facilitator being identified by way of the unique identifier of the first communications device.

10. A system for facilitating communications between a first and second party according to claim 1 or claim 9, where the first or second destination address, or both, is a shortcode.

11. A system for facilitating communications between a first and second party according to claim 1 or claim 9, where the communication facilitator is operable to determine the unique identifier of the second communications device of the second party from information contained in the first communication message.

12. A system for facilitating communications between a first and second party according to claim 1 or claim 9, where the communication facilitator is operable to determine the unique identifier of the second communications device of the second party from dial tones added as a suffix to the destination address.

13. A system for facilitating communications between a first and second party according to claim 9, where the specified monetary amount or message credit amount is included in the first communication message.

14. A system for facilitating communications between a first and second party according to claim 9, where the specified monetary amount or message credit amount is either specified as dial tones added as a suffix to the first destination address or an attribute of the destination address to which the first communication message is sent.

15. A system for facilitating communications between a first and second party according to claim 1 or claim 9, where the communications device is one of the following: a mobile phone; a personal digital assistant; a computer.

16. A system for facilitating communications between a first and second party according to claim 1 or claim 9, where the communication message is one of the following: a short messaging system message; a multimedia messaging system message; e-mail.

17. A system for facilitating communications between a first and second party according to claim 1 or claim 9 where the communication facilitator is a division of, or associated with, a telecommunications carrier.

18. A communication facilitator for use in a system for facilitating communications between a first and second party each having a communications device for communicating with the communication facilitator, where on receipt of a first communication message at a first destination address sent by the first communication device possessed by the first party, the communication facilitator determines unique identifiers of the communications devices of the first and second party, respectively, from the first communication message or information associated with the first communication message; sends a second communication message to the communication device possessed by the second party, as determined by its unique identifier, via a second destination address, the second communication message including the first communication message or at least a portion thereof; receives a reply to the second communication message from the communications device possessed by the second party; forwards the reply to the second communication message to the communications device possessed by the first party, as determined by its unique identifier, and makes a charge against credit the first party has with the communication facilitator for at least the first communication message and the reply to the second communication message, the credit the first party has with the communication facilitator being identified by way of the unique identifier of the first communications device.

19. A communication facilitator according to claim 18, where the reply to the second communication message is received via the second destination address.

20. A communication facilitator according to claim 18 or claim 19, where, when the communication facilitator sends a second communication message to the communications device possessed by the second party via the second destination address, the second communication message further includes the unique identifier of the communications device possessed by the first party; the communications facilitator operable to identify the unique identifier of communications device possessed by the first party from the reply to the second communication message either from information contained in the reply to the second communication message or as a suffix of dial tones to the destination address to which it is sent.

21. A communication facilitator according to claim 18, operable to increment at least one virtual account associated with the communications device possessed by the second party by a specified amount on receipt of the first communication message and operable to decrement the at least one virtual account by a specified amount on receipt of a reply to the second communication message.

22. A communication facilitator according to claim 18, where the communication facilitator is operable to increment a virtual account associated with both the communications devices possessed by the first party and the second party by a specified amount on receipt of the first communication message and operable to decrement the virtual account associated with both the communications devices possessed by the first and second party by a specified amount on receipt of a reply to the second communication message.

23. A communication facilitator according to claim 21 or claim 22, where the specified amount is determined from the first communication message.

24. A communication facilitator according to claim 18, operable to increment the amount of credit the second party has with the communication facilitator by a specified monetary amount on receipt of the first communication message, the amount of credit the second party has with the communication facilitator being identified by way of the unique identifier of the communications device possessed by the second party.

25. A communication facilitator according to claim 18, operable to receive the first communication message and the reply to the second communication message at a single destination address and operable to distinguish the first communication message from a second communication message by the value of a flag or a keyword.

26. A communication facilitator for use in a system for facilitating communications between a first and second party each having a communication device for communicating with the communication facilitator and at least the first party having credit with the communication facilitator, where on receipt of a first communication message sent by a first communications device possessed by the first party at a first destination address associated with the communications facilitator, unique identifiers of the first and second communications devices possessed by the first and second party, respectively, are determined from the first communication message or information associated with the first communication message; the amount of credit the second party has with the communication facilitator, as identified by way of the unique identifier of the second communications device, is increased by a specified monetary amount or message credits; the first communication message or at least a portion thereof is included in a second communication message which is sent to the second communications device of the second party via a second destination address, the second communication message including the unique identifier of the first communications device of the first party; and operable to make a charge against the credit of the first party for at least the specified amount and the first communication message, the credit the first party has with the communication facilitator being identified by way of the unique identifier of the first communications device.

27. A communication facilitator according to claim 18 or claim 26, operable to determine the unique identifier of the second communications device of the second party from information contained in the first communication message.

28. A communication facilitator according to claim 18 or claim 26, operable to determine the unique identifier of the second communications device of the second party from dial tones added as a suffix to the destination address.

29. A communication facilitator according to claim 26, operable to determine the specified monetary amount or message credit amount from information included in the first communication message.

30. A communication facilitator according to claim 26, operable to determine the specified monetary amount or message credit amount from either dial tones added as a suffix to the first destination address or from an attribute of the destination address to which the first communication message is sent.

31. A method of facilitating communications between a first and second party, comprising the steps of:
receiving a first communication message from a communications device possessed by the first party at a first destination address;
determining the unique identifiers of the communications devices possessed by the first and second party, respectively, from the first communication message or information associated with the first communication message;
including the first communication message, or at least a portion thereof, in a second communication message and sending the second communication message to the communications device possessed by the second party via a second destination address;
receiving a reply to the second communication message from the second party sent using the communications device possessed by the second party;
forwarding the reply to the second communication message to the communications device possessed by the first party; and
making a charge against credit in favour of the first party for at least the first communication message and the reply to the second communication message, the credit in favour of the first party being identified by way of the unique identifier of the communications device possessed by the first party.

32. A method of facilitating communications between a first and second party according to claim 31, where the step of receiving the reply to the second communication message is received at the second destination address.

33. A method of facilitating communications between a first and second party according to claim 31 or claim 32, including the steps of including the unique identifier of the communications device possessed by the first party in the second communication message and identifying the communications device of the first party to whom to send the reply to the second communication message by determining the unique identifier of the communications device possessed by the first party from either the information included in the reply to the second communication message or a suffix of dial tones to the destination address to which the reply to the second communication message is sent.

34. A method of facilitating communications between a first and second party according to claim 31, including the steps of incrementing a virtual account associated with the communications device possessed by the second party by a specified amount on receipt of the first communication message and decrementing the virtual account by a specified amount on receipt of a reply to the second communication message.

35. A method of facilitating communications between a first and second party according to claim 31, including the steps of incrementing a virtual account associated with both the communications devices of the first and second party by a specified amount on receipt of the first communication message and decrementing the virtual account by a specified amount on receipt of a reply to the second communication message.

36. A method of facilitating communications between a first and second party according to claim 34 or claim 35, including the step of identifying the specified amount from information in the first communication message.

37. A method of facilitating communications between a first and second party according to claim 31, including the step of incrementing credit in favour of the second party by a specified monetary amount on receipt of the first communication message, the credit in favour of the second party being identified by way of the unique identifier of the communications device possessed by the second party.

38. A method of facilitating communications between a first and second party according to claim 31, including the step of distinguishing the first communication message from a reply to the second communication message received at the same destination address by means of the value of a flag or keyword.

39. A method of facilitating communications between a first and second party, including the steps:

receiving a first communication message sent using a communications device possessed by the first party at a first destination address;

determining the unique identifiers of the communications devices of the first and second party, respectively, from the first communication message or information associated with the first communication message;

increasing credit in favour of the second party by a specified monetary amount or message credits;

including the first communication message, or at least a portion thereof, in a second communication message and sending the second communication message to the communications device possessed by the second party via a second destination address, the second communication message also including the unique identifier of the communications device possessed by the first party;

making a charge against credit balance in favour of the first party for at least the specified amount and the first communication message, the credit in favour of the first party being identified by way of the unique identifier of the communications device possessed by the first party.

40. A method of facilitating communications between a first and second party according to claim 31 or claim 39, including the step of determining the unique identifier of the communications device possessed by the second party from information contained in the first communication message.

41. A method of facilitating communications between a first and second party according to claim 31 or claim 39, including the step of determining the unique identifier of the communications device possessed by the second party from dial tones added as a suffix to the destination address.

42. A method of facilitating communications between a first and second party according to claim 39, including the step of determining the specified monetary amount or message credit amount from information included in the first communication message.

43. A method of facilitating communications between a first and second party according to claim 39, including the step of determining the specified monetary amount or message credit amount from dial tones added as a suffix to the first destination address or an attribute of the destination address to which the first communication message is sent.

44. A communication message forwarded to a communications device possessed by a first party, as determined by its unique identifier, the communication message being sent by a communication facilitator on receiving the communication message from a communications device possessed by a second party, the communication message being sent in response to a second communication message sent by the communication facilitator via a first destination address associated with the communication facilitator to the communications device possessed by the second party, as determined by its unique identifier, the second communication message including a third communication message, or at least a portion thereof, the communication facilitator operable to determine the unique identifiers of the communications devices of the first and second party from the third communication message, or from information associated therewith, where the third communication message is sent by the first party to a second destination address associated with the communication facilitator, the credit the first party has with the communication facilitator being charged for at least the communication message and the third communication message, said credit being identified by way of the unique identifier of the communications device possessed by the first party.

45. A communication message forwarded to a communications device possessed by a first party, as determined by its unique identifier, the communication message being sent by a communications device possessed by a second party on receiving a second communication message from a communication facilitator, the second communication message being forwarded to the communications device possessed by the second party via a second destination address in response to a third communication message sent using the communications device possessed by the first party, the second communication message including the third communication message, or at least a portion thereof, and the unique identifier of the communications device possessed by the first party; the payment facilitator operable to determine the unique identifiers of the first and second communications devices possessed by the first and second party, respectively, from the third communication message or information associated with the first communication message, the credit the first party has with the communication facilitator being charged for at least the communication message and a specified amount, said credit being identified by way of the unique identifier of the communications device possessed by the first party and the credit the second party has with the communication facilitator being increased by the specified amount or message credits equal to the specified amount, said credit being identified by way of the unique identifier of the communications device possessed by the second party.

46. A computer readable medium having software recorded thereon, said software including:

receiving means for receiving a first communication message from a communications device possessed by the first party at a first destination address;

identification means for determining the unique identifiers of the communications devices possessed by the first and second party, respectively, from the first communication message or information associated with the first communication message;

forwarding means for including the first communication message, or at least a portion thereof, in a second communication message and sending the second communication message to the communications device possessed by the second party via a second destination address;

reply means for receiving a reply to the second communication message from the second party sent using the communications device possessed by the second party;

onforwarding means for forwarding the reply to the second communication message to the communications device possessed by the first party; and accounting means for making a charge against credit in favour of the first party for the at least the first communication message and the reply to the second communication message, the credit in favour of the first party being identified by way of the unique identifier of the communications device possessed by the first party.

47. A computer readable medium having software recorded thereon, said software including:

receiving means for receiving a first communication message sent using a communications device possessed by the first party at a first destination address;

identification means for determining the unique identifiers of the communications devices of the first and second party, respectively, from the first communication message or information associated with the first communication message;

crediting means for increasing credit in favour of the second party by a specified monetary amount or message credits;

forwarding means for including the first communication message, or at least a portion thereof, in a second communication message and sending the second communication message to the communications device possessed by the second party via a second destination address, the second communication message also including the unique identifier of the communications device possessed by the first party;

accounting means for making a charge against credit in favour of the first party for at least the specified amount and the first communication message, the credit in favour of the first party being identified by way of the unique identifier of the communications device possessed by the first party.

* * * * *